US012781711B2

(12) United States Patent
Kim et al.

(10) Patent No.: US 12,781,711 B2
(45) Date of Patent: Nov. 3, 2026

(54) BLADELESS WIND ENERGY HARVESTER

(71) Applicant: PUSAN NATIONAL UNIVERSITY INDUSTRY-UNIVERSITY COOPERATION FOUNDATION, Busan (KR)

(72) Inventors: Kyung Chun Kim, Busan (KR); Aref Afsharfard, Busan (KR); Amirreza Shahsavari, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 2 days.

(21) Appl. No.: 18/924,390

(22) Filed: Oct. 23, 2024

(65) Prior Publication Data

US 2025/0172123 A1 May 29, 2025

(30) Foreign Application Priority Data

Nov. 24, 2023 (KR) ........................ 10-2023-0165698
Feb. 26, 2024 (KR) ........................ 10-2024-0027111

(51) Int. Cl.
*F03D 15/10* (2016.01)

(52) U.S. Cl.
CPC .................................... *F03D 15/10* (2016.05)

(58) Field of Classification Search
CPC . F03D 15/10; F03D 5/00; F03D 5/005; F03D 5/06; H02N 2/186

(Continued)

(56) References Cited

U.S. PATENT DOCUMENTS 640,003 A * 12/1899 Landon .................. F04D 33/00 74/30
7,199,480 B2 * 4/2007 Fripp .................. H10N 35/101 290/1 R (Continued)

FOREIGN PATENT DOCUMENTS

CN 108111058 B * 4/2019 ............. H02N 2/185
CN 111852771 B * 3/2022 ............. F03D 17/00

(Continued)

OTHER PUBLICATIONS

Zhang et al. Experimental investigation of aerodynamic energy harvester with different interference cylinder cross-sections (Year: 2018).*

(Continued)

*Primary Examiner* — Tulsidas C Patel
*Assistant Examiner* — S. Mikailoff
(74) *Attorney, Agent, or Firm* — Paratus Law Group, PLLC

(57) ABSTRACT

A bladeless wind energy harvester includes: an oscillating body; an aerodynamic barrier spaced apart from the oscillating body and having a longer plane section than the oscillating body; a gear box located below the oscillating body to rotatably support the oscillating body and to transfer oscillation of the oscillating body; and a generator connected to the gear box with a shaft. The oscillating body and the aerodynamic barrier are parallel to each other so that the oscillating body oscillates by vortices generated from the interaction of wind with the oscillating body and the aerodynamic barrier to allow the generator to generate electric energy.

4 Claims, 10 Drawing Sheets

(58) Field of Classification Search
USPC .............................................. 290/1 R, 44, 55
See application file for complete search history.

(56) References Cited

U.S. PATENT DOCUMENTS

| | | | | | |
|---|---|---|---|---|---|
| 7,208,845 | B2 * | 4/2007 | Masters | H02K 7/1892 290/1 R | |
| 7,224,077 | B2 * | 5/2007 | Allen | F03D 5/00 290/1 R | |
| 9,444,372 | B2 * | 9/2016 | Yañez Villarreal | F03D 9/25 | |
| 9,541,056 | B2 * | 1/2017 | Wigant | F03B 13/187 | |
| 9,856,854 | B2 * | 1/2018 | Yañez Villarreal | F03D 9/25 | |
| 10,560,040 | B2 * | 2/2020 | Ahmad | H10N 35/101 | |
| 10,641,243 | B2 * | 5/2020 | Yañez Villarreal | H02K 7/09 | |
| 10,662,922 | B2 * | 5/2020 | Sichman | F03D 5/06 | |
| 10,982,648 | B2 * | 4/2021 | Azadi Yazdi | H02N 2/188 | |
| 11,053,914 | B2 * | 7/2021 | Yáñez Villarreal | F03D 5/06 | |
| 11,187,205 | B2 * | 11/2021 | Vaccari | F03D 13/22 | |
| 12,103,434 | B2 * | 10/2024 | In | F03D 3/002 | |
| 12,199,436 | B2 * | 1/2025 | Lu | H02N 2/186 | |
| 2008/0048455 | A1 * | 2/2008 | Carney | F03D 5/00 290/54 | |
| 2009/0218822 | A1 * | 9/2009 | Rink | F03B 13/264 290/54 | |
| 2009/0224549 | A1 | 9/2009 | Williams | | |
| 2009/0224553 | A1 * | 9/2009 | Williams | F03D 5/06 290/55 | |
| 2018/0328337 | A1 * | 11/2018 | Sichman | F03B 17/06 | |
| 2020/0049130 | A1 * | 2/2020 | Yáñez Villarreal | F03D 5/06 | |

FOREIGN PATENT DOCUMENTS

| | | | | | |
|---|---|---|---|---|---|
| CN | 117780584 | A | * | 3/2024 | F03G 3/06 |
| DE | 433513 | C | * | 9/1926 | F03D 5/005 |
| KR | 10-0960042 | B1 | | 5/2010 | |
| KR | 10-2015-0101546 | A | | 9/2015 | |
| KR | 10-2018-0106569 | A | | 10/2018 | |
| KR | 10-1931268 | B1 | | 12/2018 | |
| WO | WO 2016/116657 | A1 | | 7/2016 | |

OTHER PUBLICATIONS

Extended European Search Report for related EP Application No. 24211464.3 mailed Mar. 28, 2025 from European Patent Office.

H T Li et al., "Dynamics and performance evaluation of a vortex-induced vibration energy harvester with hybrid bluff body", Smart Materials and Structures, Mar. 16, 2023, pp. 1-12, vol. 32, No. 045016.

Junlei Wang et al., "Wake galloping energy harvesting in heat exchange systems under the influence of ash deposition", Energy, May 6, 2022, pp. 1-11, vol. 253, No. 124175.

Weilin Liao et al., "A Novel Magnetic-Coupling Non-Contact Piezoelectric Wind Energy Harvester With a Compound-Embedded Structure", IEEE Sensors Journal, May 1, 2022, pp. 8428-8438, vol. 22, No. 9.

Korean Notice of Allowance for related KR Application No. 10-2024-0027111 mailed Feb. 2, 2026 from Korean Intellectual Property Office.

* cited by examiner

BLADELESS WIND ENERGY HARVESTER

CROSS-REFERENCE TO PRIOR APPLICATIONS

This application claims priority to Korean Patent Application Nos. 10-2023-0165698 (filed on Nov. 24, 2023) and 10-2024-0027111 (filed on Feb. 26, 2024), which are all hereby incorporated by reference in their entirety.

BACKGROUND

The present invention relates to a wind Energy Harvester, more specifically to a bladeless wind energy generator capable of converting the strong vortex-induced vibrations of the oscillating body, produced by the fluid-structure interaction between wind and oscillating body, to continuous rotary motion through mechanical rectification. To do so the downstream vortices are intensified through merging of added obstacle vortices.

Generally, a wind turbine is a device that converts wind energy into electric energy using the rotational forces generated from blades rotating. For example, a conventional wind turbine having a blade orientation angle-adjuster is disclosed in Korean Patent No. 10-0960042 (May 31, 2010).

International Publication No. WO 2016/116657 (Jul. 28, 2016) relates to a system and method for obtaining energy from a fluid, comprising a vortex generator for generating vortices in a fluid, formed by at least one obstructing body and a cantilevered lever which deforms at the free end thereof and is anchored to the obstructing body.

In the case of the conventional horizontal axis wind turbine, however, a low energy generation efficiency of about 40 to 45% is reported, and disadvantageously, a lot of time and costs in manufacturing, delivering, installing, and repairing the wind turbine are needed.

Related Art: Korean Patent No. 10-0960042 (May 31, 2010)

International Publication No. WO 2016/116657 (Jul. 28, 2016)

SUMMARY

Accordingly, the present invention has been made given the problems mentioned above occurring in the related art, and it is an object of the present invention to provide a bladeless wind energy harvester that is capable of using the strong vortex-induced vibrations generated by downstream vortices that are intensified through the merging of obstacle vortices. Oscillations of the oscillating body, which performs the role of an inverted pendulum, prepares the continuous rotation of the generator, and consequently, the wind energy will convert into electric energy.

The technical problems to be achieved through the present invention are not limited as mentioned above, and other technical problems not mentioned herein will be obviously understood by one of ordinary skill in the art through the following description.

To accomplish the above-mentioned objects of the present invention, a bladeless wind energy harvester according to an embodiment of the present invention includes: an oscillating body; an aerodynamic barrier spaced apart from the oscillating body and having a longer plane section than the oscillating body; a gear box located below the oscillating body to rotatably support the oscillating body and transferring the rotation of the oscillating body; and a generator connected to the gear box and mechanical rectifier by means of a shaft, wherein the oscillating body and the aerodynamic barrier are parallel to each other so that the oscillating body rotates by means of vortices generated from the interaction between wind and the aerodynamic barrier to allow the generator to generate electric energy, and wherein the obstacle located on the downstream flow of the bluff body is bent at or entirely rounded around the central portion thereof, so that the wind colliding against the obstacle is prevented from flowing outward and thus induced to flow toward the bluff body.

According to an embodiment of the present invention, further, the gear box includes a mechanical rectifier adapted to convert the reciprocal rotations of the shaft into a unidirectional rotation.

According to an embodiment of the present invention, the wind turbine further includes a distance adjuster coupled to the aerodynamic barrier and transferring the aerodynamic barrier to adjust a distance between the oscillating body and the aerodynamic barrier.

According to an embodiment of the present invention, the wind turbine further includes a base supporting the gear box and the aerodynamic barrier in such a way as to be rotatable around a shaft vertical to the surface of the ground.

According to an embodiment of the present invention, the wind energy generator includes a flow guide attached to the foundation plate that holds the oscillating body and the aerodynamic barrier in such a way as to have a plane section in a vertical direction to the aerodynamic barrier, wherein if the wind blows different with the flow guide direction, the foundation plate rotates to allow the aerodynamic barrier to be placed in a direction toward the wind.

According to an embodiment of the present invention, the bladeless wind energy harvester is capable to use the vortex induced vibrations generated upon interaction between wind and the oscillating body to rotate the generator and convert wind energy into electric energy.

That is, the main principle of the bladeless wind energy generator according to the present invention makes use of vibrations produced from the vortices generated when wind blows across the wind energy generator to convert wind energy into electric energy. The conventional wind turbine having blades has power generation efficiency of 40 to 45%, but the bladeless wind turbine according to the present invention has power generation efficiency of about 60% or more. Further, the bladeless wind turbine according to the present invention is reduced in manufacturing, delivering, installing, and repairing costs, and as rotations of blades do not exist, the bladeless wind energy harvester according to the present invention is provided with parts that do not require a lot of motions, so that the time and cost for the maintenance of the parts are reduced. Furthermore, the bladeless wind energy harvester according to the present invention has no blade with rotary motion, thereby allowing humans and animals to live safely near it, it generates lower acoustic noise, all mechanical and electrical parts are close to the ground and it can easily be maintained, and it can be located on regions relatively close to cities or energy consumption districts.

The effectiveness of the invention is not limited as mentioned above, and it should be understood to those skilled in the art that the effectiveness of the invention may include another effectiveness as not mentioned above from the detailed description of the present invention.

DETAILED DESCRIPTION

Terms used in the specification will be explained briefly, and an embodiment of the present invention will be explained in detail.

All terms as will be discussed later are defined in accordance with the functions of the present invention, but may be varied under the intention or regulation of a user or operator. Therefore, they should be defined on the basis of the whole scope of the present invention.

In the description, when it is said that one portion is described as "includes" any component, one element further may include other components unless no specific description is suggested.

Hereinafter, an embodiment of the present invention will be explained in detail with reference to the attached drawings to be easily understood by those of ordinary skill in the art. However, the present invention may be freely modified within the scope of the invention, without being limited to embodiments discussed later.

Technical problems and solutions of the present invention and the effectiveness of the present invention will be included in the detailed description as will be described below and the attached drawings. Objects, characteristics and advantages of the present invention will be more clearly understood from the detailed description as will be described below and the attached drawings.

Flow-induced vibration (FIV) is a physical phenomenon widely observed in an engineering field, which is generated by aerodynamic instability or vortex shedding when a fluid blows across a thin structure. That is, a wind turbine of the present invention is an FIV energy harvesting device that extracts (harvests) energy from a flow field therearound and thus provides power. While a fluid is flowing along an oscillating body, a vortex distance or Karman vortex distance is generated from a vortex region. Periodical vortex shedding from the surface of the oscillating body applies asymmetrical pressure to the structure and thus produces alternating aerodynamic forces. Such alternating aerodynamic forces cause the vibrations of the oscillating body, and the vibrations are used to produce power.

Hereinafter, an embodiment of the present invention will be described in detail with reference to the attached drawings.

Figure 1:
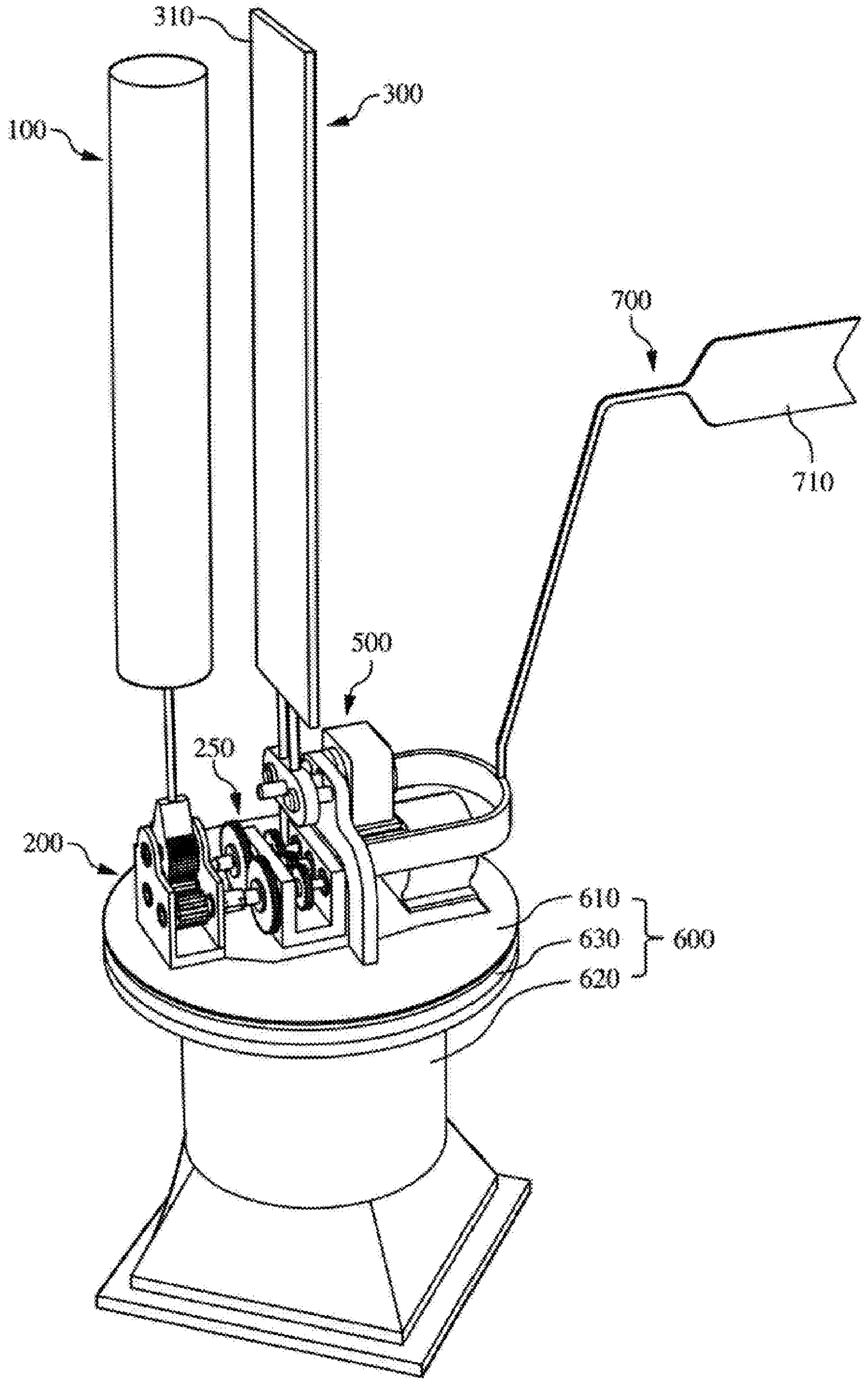
FIG. 1 is a perspective view showing a bladeless wind energy harvester according to an embodiment of the present invention.

Referring to FIG. 1, a wind turbine according to an embodiment of the present invention includes an oscillating body 100, an aerodynamic barrier 300 spaced apart from the oscillating body 100 and having a larger plane section than the oscillating body 100, a gear box 200 located below the oscillating body 100 to rotatably support the oscillating body 100 and transferring the rotation of the oscillating body 100, and a generator 400 connected to the gear box 200 by means of a shaft, wherein the oscillating body 100 and the aerodynamic barrier 300 are parallel to each other so that the oscillating body 100 rotates by means of vortices generated from the collision between wind and the aerodynamic barrier 300 to allow the generator 400 to produce electric energy.

Figure 2:
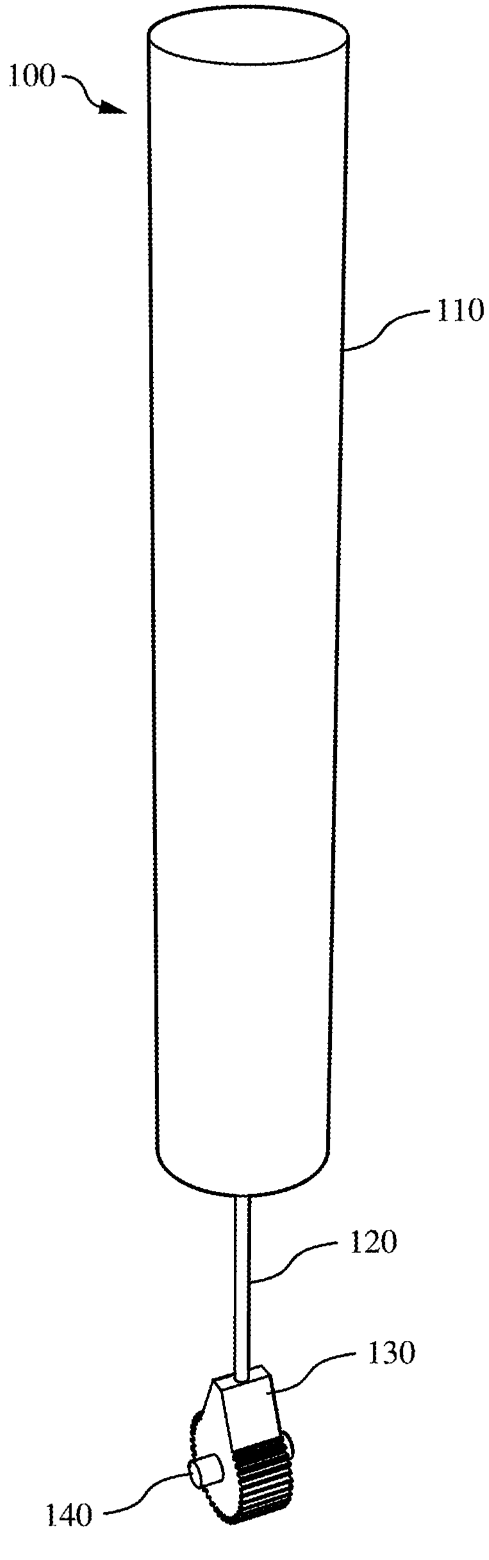
FIG. 2 is a perspective view showing an oscillating body of the bladeless wind energy harvester according to an embodiment of the present invention.

First, the oscillating body 100 is provided. The oscillating body 100 is a massive object that rotates by means of the vortices generated from the interaction between wind and the aerodynamic barrier 300 and thus transmits wind energy in the form of a pendulum motion. For example, referring to FIG. 2, the oscillating body 100 includes a cylindrical main body 110, a connection bar 120 extending from the underside of the main body 110, a partial gear 130 located on the underside of the connection bar 120 and having at least a portion as a toothed gear, and a rotary shaft 140 located at the center of the partial gear 130 to allow the oscillating body 100 to be rotatable. In this case, the rotary shaft 140 is supportedly inserted into a rotary shaft hole 211 as will be discussed later, and the oscillating body 100 performs the pendulum motion around the rotary shaft 140. As the oscillating body 100 rotates, further, the partial gear 130 rotates to allow a first transmission gear 220 or second transmission gear 230 as will be discussed later to rotate, and then, the rotation of the oscillating body 100 is converted into unidirectional rotation through a mechanical rectifier 250 as will be discussed later, so that the rotation of the oscillating body 100 is transferred to the generator 400 to allow electric energy to be generated from the generator 400.

Figure 3:
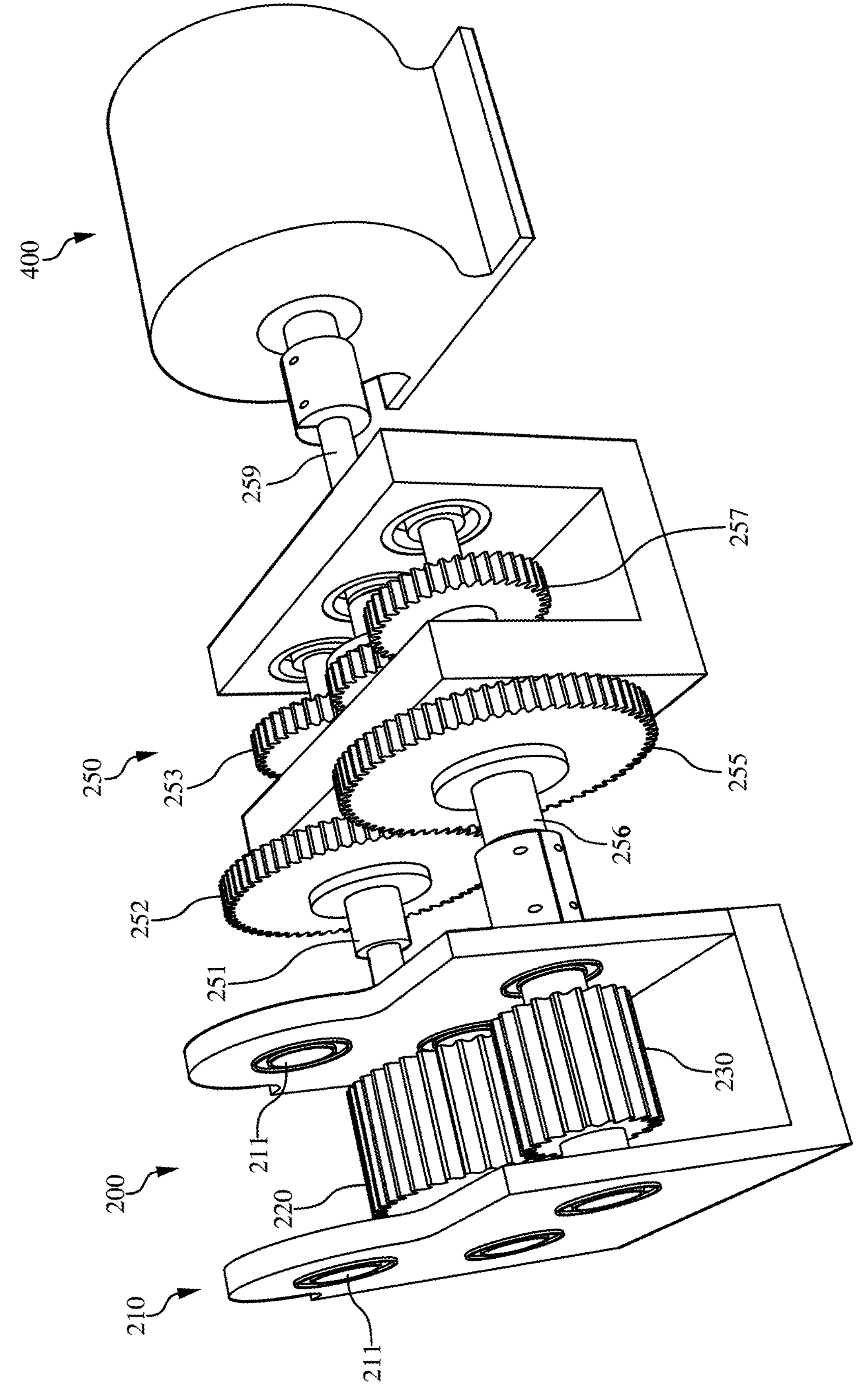
FIG. 3 is a perspective view showing a gear box of the wind turbine according to an embodiment of the present invention.

Next, the gear box 200 is provided. The gear box 200 transfers the rotation of the oscillating body 100 generated by the vortices of wind to the generator 400 in the form of a rotational motion. For example, referring to FIG. 3, the gear box 200 includes a rotational frame 210 having an empty space formed therein and the first transmission gear 220 and the second transmission gear 230 arranged side by side in such a way as to be rotatable inside the rotational frame 210, and the rotational frame 210 has the rotary shaft hole 211 formed on an upper portion thereof in such a way as to insert the rotary shaft 140 thereinto and rotatably support the rotary shaft 140 and bearings. In this case, the partial gear 130 is located engaged with the first transmission gear 220 and the second transmission gear 230, so that the rotation of the partial gear 130 is transferred to the first transmission gear 220 and the second transmission gear 230.

Further, the gear box 200 includes the mechanical rectifier 250 adapted to convert the rotation of the shaft into unidirectional rotation. That is, while the mechanical rectifier 250 is receiving the pendulum motion of the oscillating body 100, it converts rotations of one direction and the other direction into the unidirectional rotation and transfers the converted rotation to the generator 400. In detail, the mechanical rectifier 250 converts a clockwise rotation and a counterclockwise rotation into the unidirectional rotation to allow the shaft connecting the gear box 200 and the generator 400 to rotate unidirectionally.

In more detail, if the mechanical rectifier 250 is not provided, the shaft performs a reciprocal rotation, not a unidirectional rotation, as the partial gear 130 moves. That is, if the partial gear 130 rotates in a clockwise direction, the first transmission gear 220 and the second transmission gear 230 rotate in counterclockwise directions to allow the shaft to rotate in the counterclockwise direction, and if the partial gear 130 is returned to its original position or rotates in the counterclockwise direction, the first transmission gear 220 and the second transmission gear 230 rotate in the clockwise directions to allow the shaft to rotate in the clockwise direction. That is, the mechanical rectifier 250 converts the reciprocal rotation into the unidirectional rotation to allow the rotation in a given direction to be transferred to the generator 400. In this case, the mechanical rectifier 250 may further include a planetary gear (not shown) adapted to increase a rotational speed.

Figure 4:
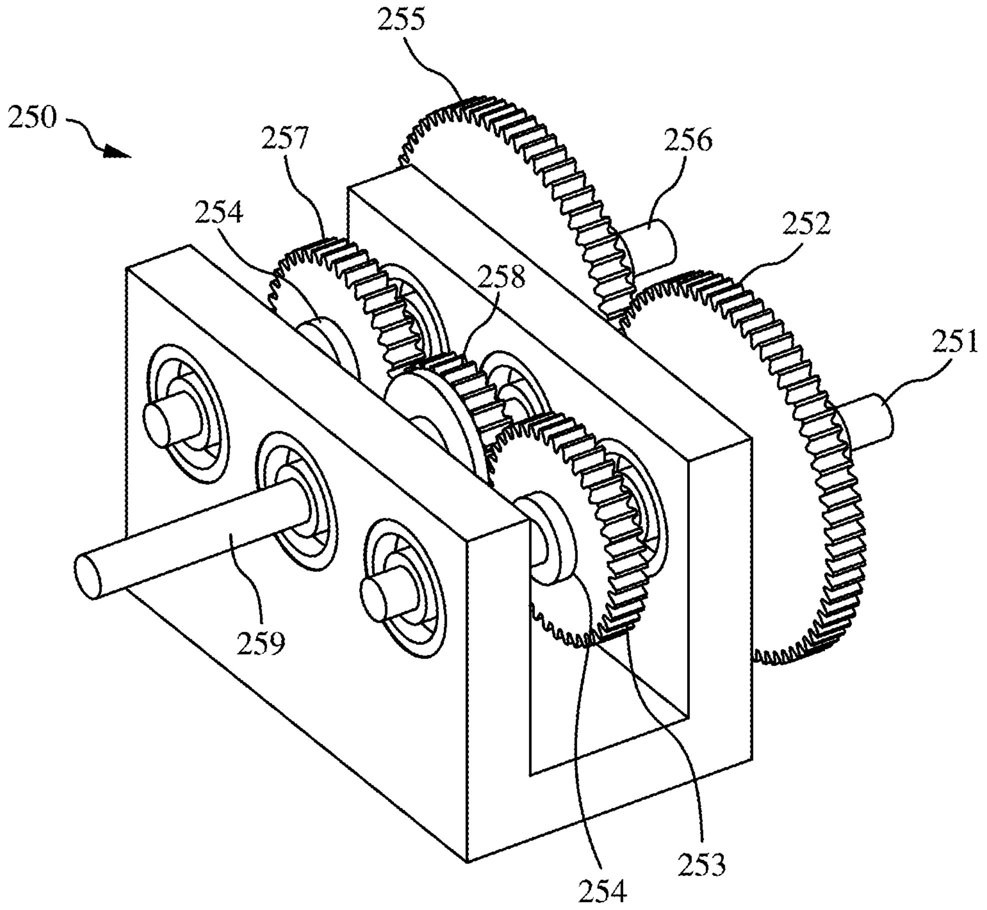
FIG. 4 is a perspective view showing a mechanical rectifier of the wind turbine according to an embodiment of the present invention.

For example, referring to FIG. 4, the mechanical rectifier 250 includes a first shaft 251 rotating by receiving the rotational motion of the partial gear 130 through the first transmission gear, a first gear 252 rotating together with the first shaft 251, a second gear 253 rotating together with the first shaft 251 in such a way to be spaced apart from the first gear 252, a third gear 255 located close to the first gear 252 in such a way as to rotate together with the first gear 252 in the opposite direction to the rotational direction of the first gear 252, a second shaft 256 rotating together with the third gear 255 or rotating by receiving the rotational motion of the partial gear 130 or the rotational motion of the second transmission gear 230, a fourth gear 257 rotating together with the second shaft 256 in such a way as to be arranged on the same line as the second gear 253, an output gear 258 located between the second gear 253 and the fourth gear 257, an output shaft 259 rotating together with the output gear 258 to transfer the rotational motion to the generator 400, and unidirectional clutches 254 located on the second gear 253 and the fourth gear 257 to allow the second gear 253 and the fourth gear 257 to rotate unidirectionally.

Accordingly, the rotational motion of the partial gear 130 is transferred to the first transmission gear 220 and then transferred to the first gear 252 through the first shaft 251. In this case, the clockwise rotational motion of the first shaft 251 rotates the first gear 252 in the clockwise direction, and also, the unidirectional clutch 254 located on the second gear 253 rotates in the clockwise direction. As the unidirectional clutch 254 closed in the clockwise direction is coupled to the second gear 253, the clockwise rotational motion of the first shaft 251 is transferred to the second gear 253. Contrarily, the counterclockwise rotational motion of the third gear 255 operating through the clockwise rotational motion of the first gear 252 is transferred to the unidirectional clutch 254 located on the fourth gear 257 through the second shaft 256. In this case, also, as the unidirectional clutch 254 located on the fourth gear 257 is closed in the clockwise direction and open in the counterclockwise direction, the counterclockwise rotational motion of the second shaft 256 is not transferred to the fourth gear 257. Accordingly, the output gear 258 rotates in the counterclockwise direction, and also, the output shaft 259 rotates in the counterclockwise direction.

Contrarily, the counterclockwise rotational motion of the first shaft 251 rotates the first gear 252 in the counterclockwise direction. As the unidirectional clutch 254 located on the second gear 253 is open in the counterclockwise direction, the counterclockwise rotational motion of the first shaft 251 is not transferred to the second gear 253. Contrarily, the third gear 255 rotates in the clockwise direction through the counterclockwise rotational motion of the first gear 252, and the clockwise rotation of the third gear 255 is transferred to the unidirectional clutch 254 located on the fourth gear 257 through the second shaft 256. In this case, also, as the unidirectional clutch 254 located on the fourth gear 257 is closed in the clockwise direction, the fourth gear 257 rotates in the clockwise direction through the clockwise rotational motion of the second shaft 256. Accordingly, the output gear 258 rotates in the counterclockwise direction through the clockwise rotation of the fourth gear 257, and also, the output shaft 259 rotates in the counterclockwise direction. As a result, the output shaft 259 rotates unidirectionally, that is, only in the counterclockwise direction, without being influenced by the rotational direction of the shaft. That is, the reciprocal rotation of the partial gear 130 through the pendulum motion of the oscillating body 100 is transferred to the output shaft 259, so that as the output shaft 259 rotates only in the counterclockwise direction, the electric power can be generated consistently through the generator 400.

Next, the aerodynamic barrier 300 is provided. The aerodynamic barrier 300 serves to collide against wind to induce the wind to generate vortices. For example, the aerodynamic barrier 300 has the shape of a plate with a longer horizontal length than a diameter of the main body 110. That is, the aerodynamic barrier 300 includes a plane section portion 310 having the shape of a rectangular plate and coupling bars 320 coupled between the underside of the plane section portion 310 and a slider 510 as will be discussed later. Further, the aerodynamic barrier 300 is linearly transferred by means of a distance adjuster 500 as will be discussed later, so that a distance between the aerodynamic barrier 300 and the oscillating body 100 can be adjusted. Furthermore, the aerodynamic barrier 300 is arranged parallel to the oscillating body 100 and a flow guide 700 as will be discussed later in a straight line.

Figure 5:
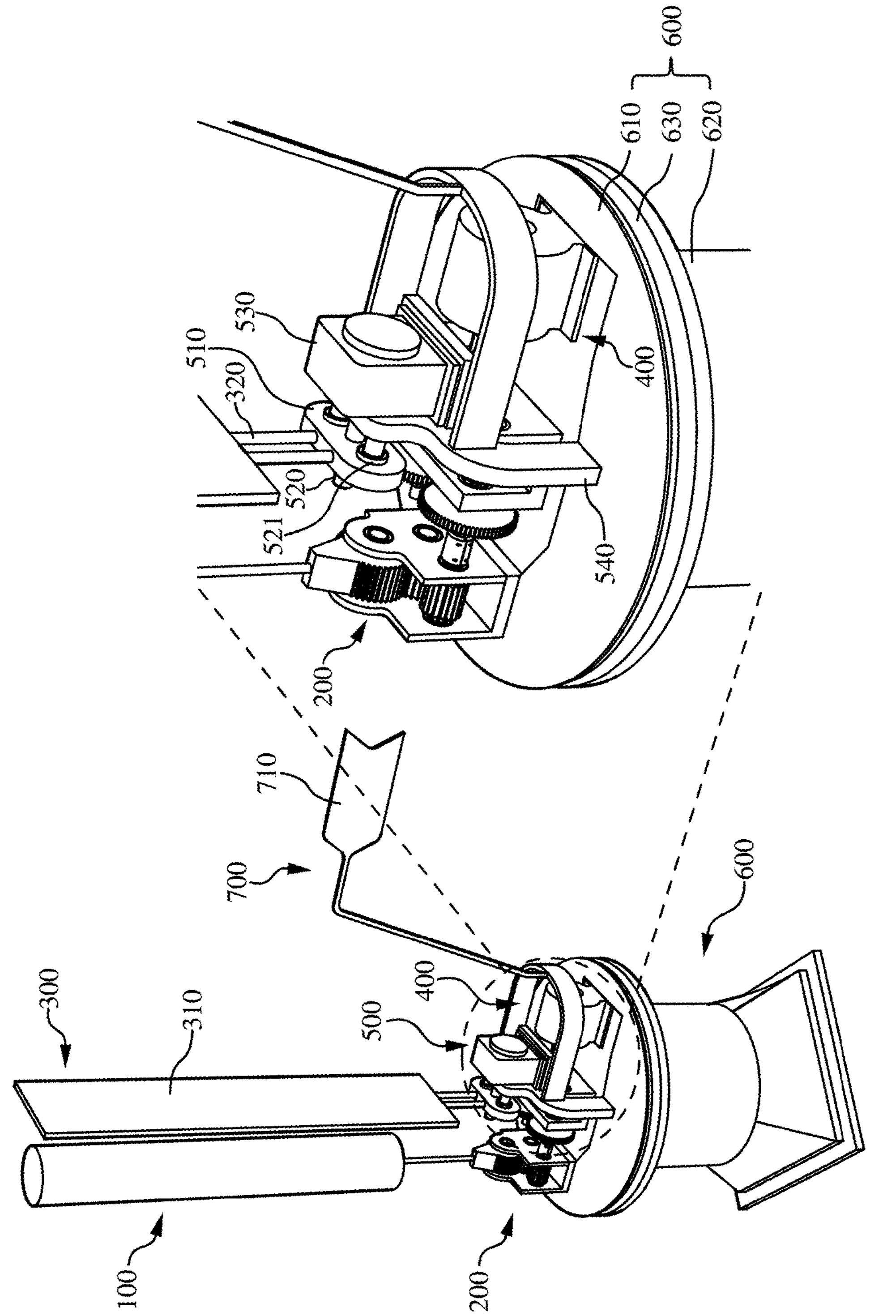
FIG. 5 is an enlarged perspective view showing a distance adjuster and a base of the bladeless wind energy harvester according to an embodiment of the present invention.

Next, referring to FIG. 5, the bladeless wind energy harvester according to the present invention further includes the distance adjuster 500 coupled to the aerodynamic barrier 300 and linearly transferring the aerodynamic barrier 300 to adjust a distance between the oscillating body 100 and the aerodynamic barrier 300. That is, the distance adjuster 500 is configured to allow the aerodynamic barrier 300 to linearly reciprocate in a direction toward the oscillating body 100 so that the distance between the aerodynamic barrier 300 and the oscillating body 100 is adjustable. For example, the distance adjuster 500 includes the slider 510 coupled to the coupling bars 320, a screw 520 inserted into the slider 510 and thus rotating, linear bearings 521, a step motor 530 connected to the screw 520 to provide a driving force for rotating the screw 520, and a rigid frame 540 coupled to a base 600 as will be discussed later and supporting the step motor 530. If the step motor 530 rotates in one direction, the screw 520 rotates in one direction to allow the slider 510 to be linearly transferred in the direction toward the oscillating body 100, and if the step motor 530 rotates in the other direction, the screw 520 rotates in the other direction to allow the slider 510 to be linearly transferred in the opposite direction to the direction toward the oscillating body 100. As a result, the distance between the aerodynamic barrier 300 and the oscillating body 100 is adjustable.

Next, the bladeless wind energy harvester according to the present invention further includes the base 600 supporting the gear box 200 and the aerodynamic barrier 300 in such a way as to be rotatable around a shaft vertical to the surface of the ground. For example, the base 600 has a plate body in the shape of a disc and supported against a trust bearing 630 in such a way as to rotate by means of the flow guide 700 as will be discussed later according to the direction of the wind. That is, the base 600 includes the plate body 610 having the shape of a disc, a support body 620 located under the plate body 610 to support the plate body 610, and the trust bearing 630 located between the plate body 610 and the support body 620 to rotate the plate body 610. In this case, a vertical rotational shaft is provided for the plate body 610, so that the plate body 610 rotates around the rotational shaft vertical to the surface of the ground.

Further, the bladeless wind energy harvester according to the present invention includes the flow guide 700 arranged side by side with the oscillating body 100 and the aerodynamic barrier 300 above the base 600 in such a way as to have a plane section in a vertical direction to the aerodynamic barrier 300, and if the wind collides against the flow guide 700, the base 600 rotates to allow the aerodynamic barrier 300 to be placed in a direction toward the wind. That is, the aerodynamic barrier 300 and the flow guide 700 are arranged in directions vertical to each other. In detail, the plane section portion 310 of the aerodynamic barrier 300 and a plane section portion 710 of the flow guide 700 are arranged vertical to each other to allow the aerodynamic barrier 300 to be placed in a direction toward the wind. For example, referring to FIG. 5, if wind blows from the bottom on the left side toward the top on the right side, that is, if wind blows toward a thin side portion of the aerodynamic barrier 300 in a direction vertical to the direction toward the plane section portion 310 of the aerodynamic barrier 300, the number of vortices generated is reduced. In this case, as the wind blowing in the direction vertical to the direction toward the plane section portion 310 of the aerodynamic barrier 300 collides against the plane section portion 710 of the flow guide 700, the plate body 610 rotates in the counterclockwise direction to allow the plane section portion 310 of the aerodynamic barrier 300 to be placed in the direction toward the wind. As a result, the plate body 610 rotates according to real-time flow of wind to allow the plane section portion 310 of the aerodynamic barrier 300 to be placed in the direction toward the wind, thereby enabling consistent power generation.

Figure 6:
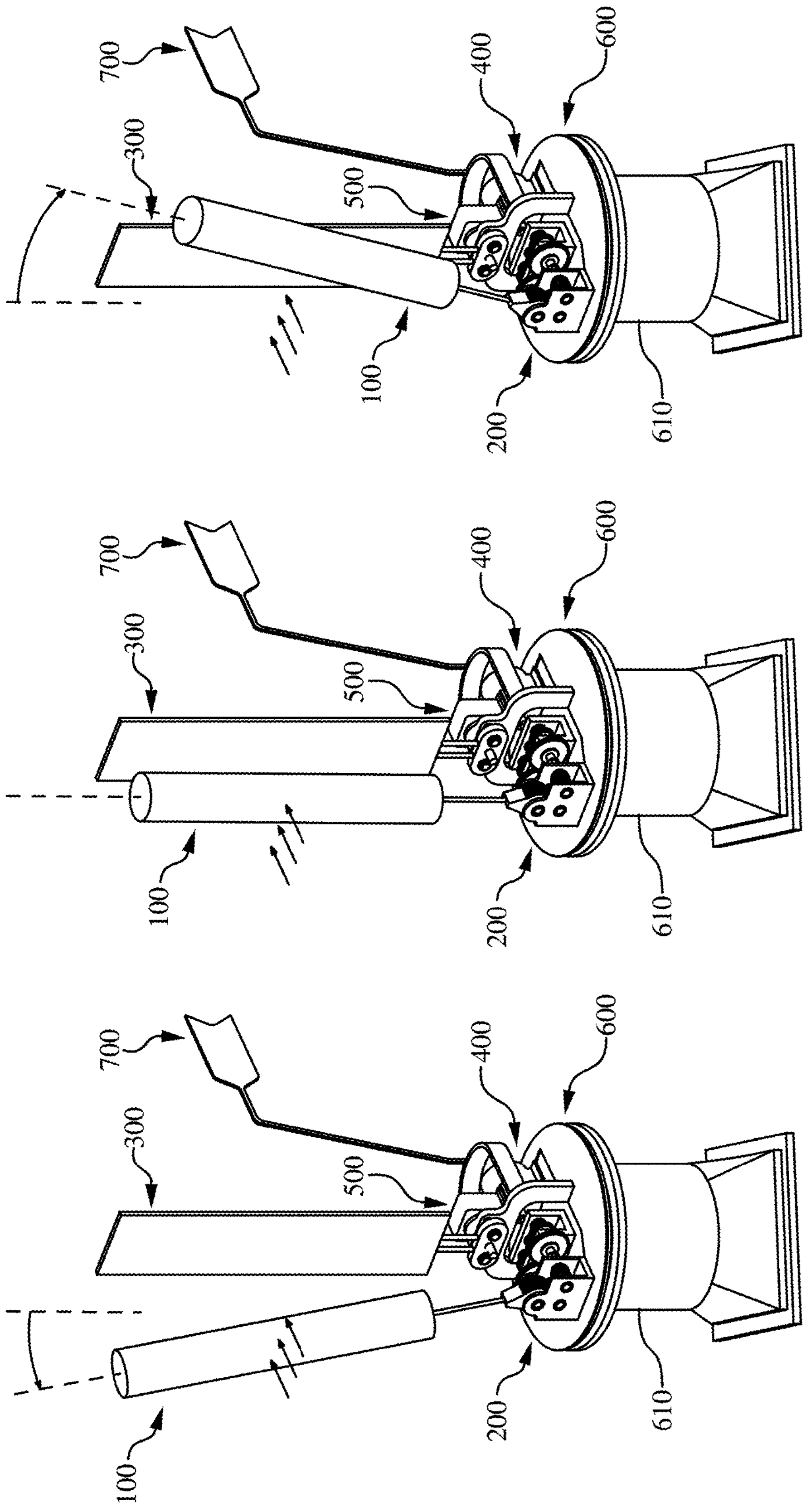
FIG. 6 illustrate perspective views (a)-(c), showing the pendulum motion of the oscillating body by means of the wind in the bladeless wind energy harvester according to an embodiment of the present invention.

Referring to FIG. 6, (a) to (c), accordingly, the oscillating body 100 rotates through the vortices generated by the collision between the wind and the aerodynamic barrier 300, and the rotational motion of the oscillating body 100 is transferred to the generator 400 through the gear box 200.

Figure 7:
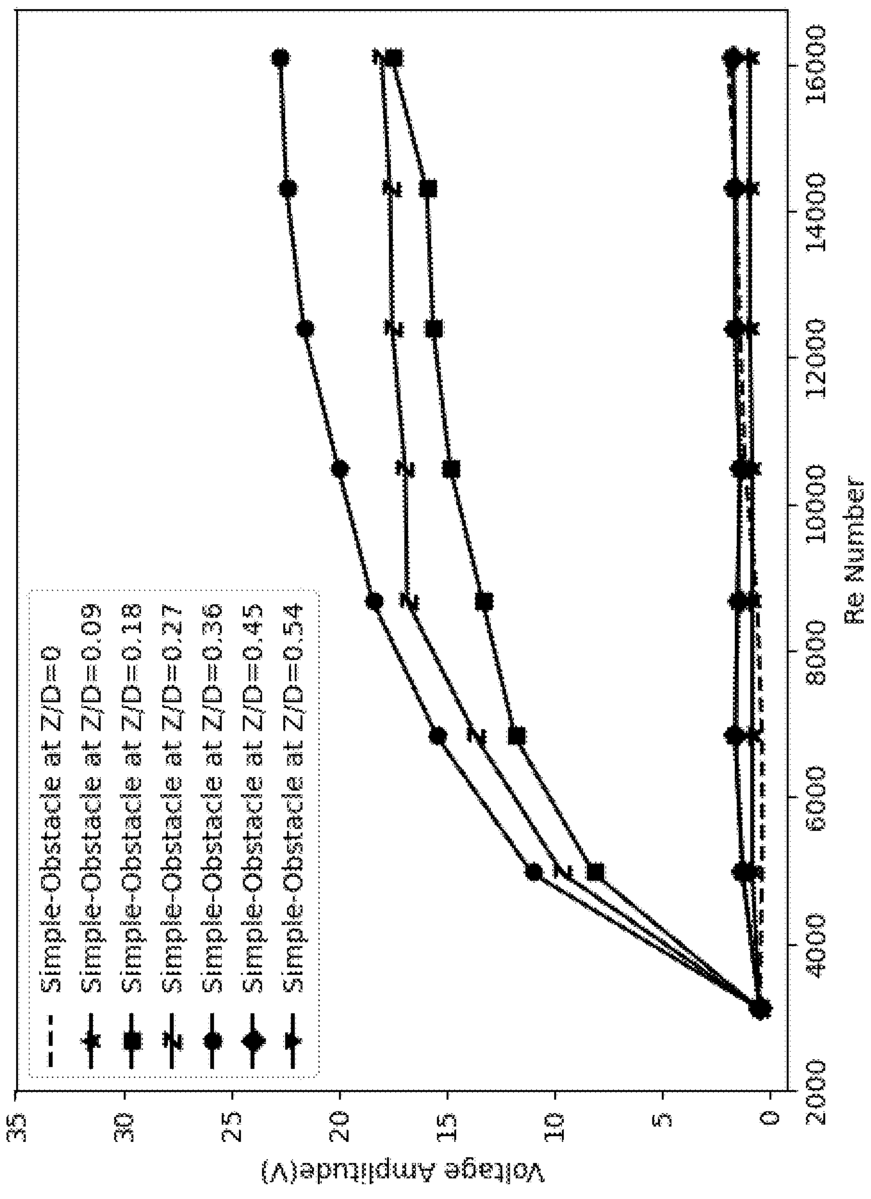
FIGS. 7 and 8 are graphs showing voltages by Reynolds number per an oscillating body diameter and a distance between the oscillating body and an aerodynamic barrier in the bladeless wind energy harvester according to an embodiment of the present invention.
Figure 8:
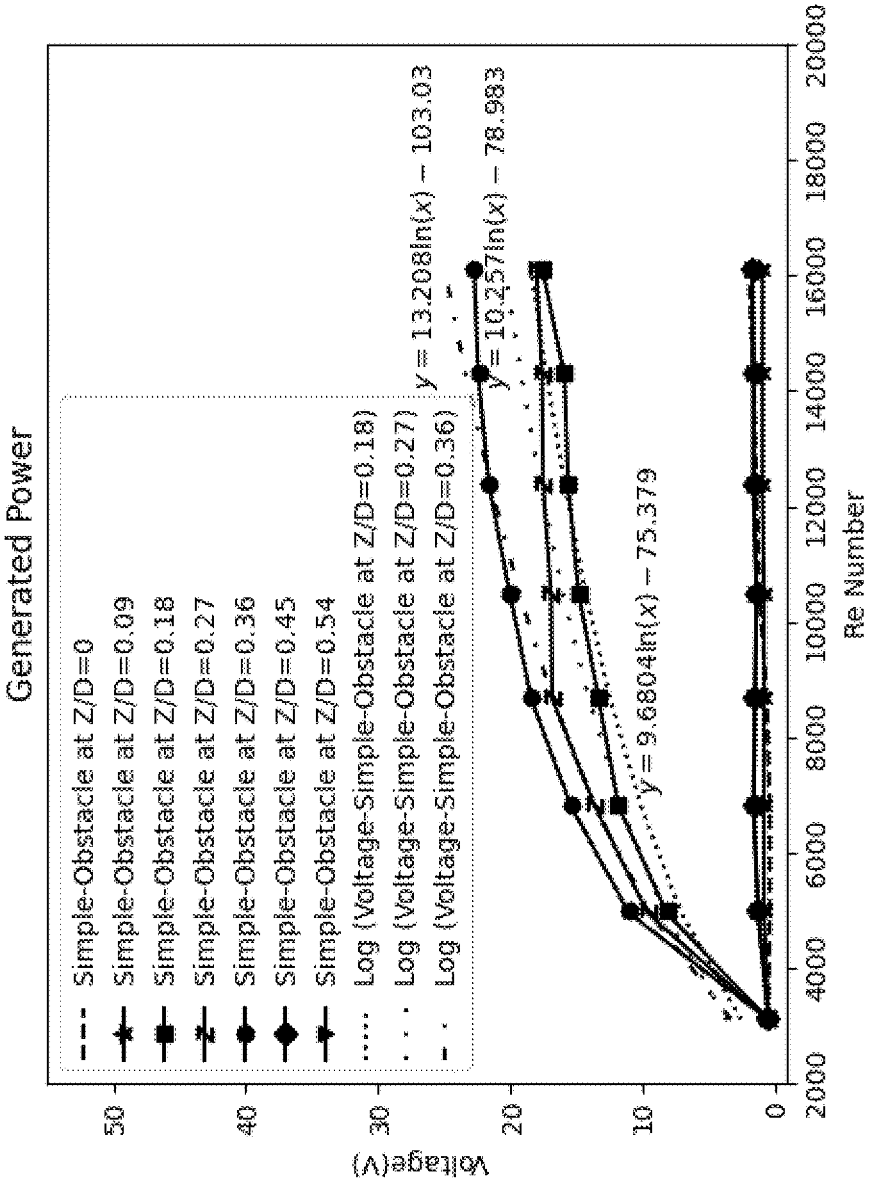

In this case, referring to FIGS. 7 and 8, a ratio of a distance Z between the oscillating body 100 and the aerodynamic barrier 300 to a diameter D of the oscillating body 100 is 0.3 to 0.4. In detail, if a ratio of the distance Z between the oscillating body 100 and the aerodynamic barrier 300 to the diameter D of the oscillating body 100 is 0.36, the highest power generation efficiency is obtained.

Further, the bladeless wind energy harvester according to the present invention obtains high power generation efficiency as vortices having high Reynolds number are generated. Accordingly, the cross-sectional shape of the oscillating body 100, 101, 102 has a shape configured to induce the wind to have a turbulent flow, as shown in FIG. 9, (a), (b), and (c).

Figure 9:
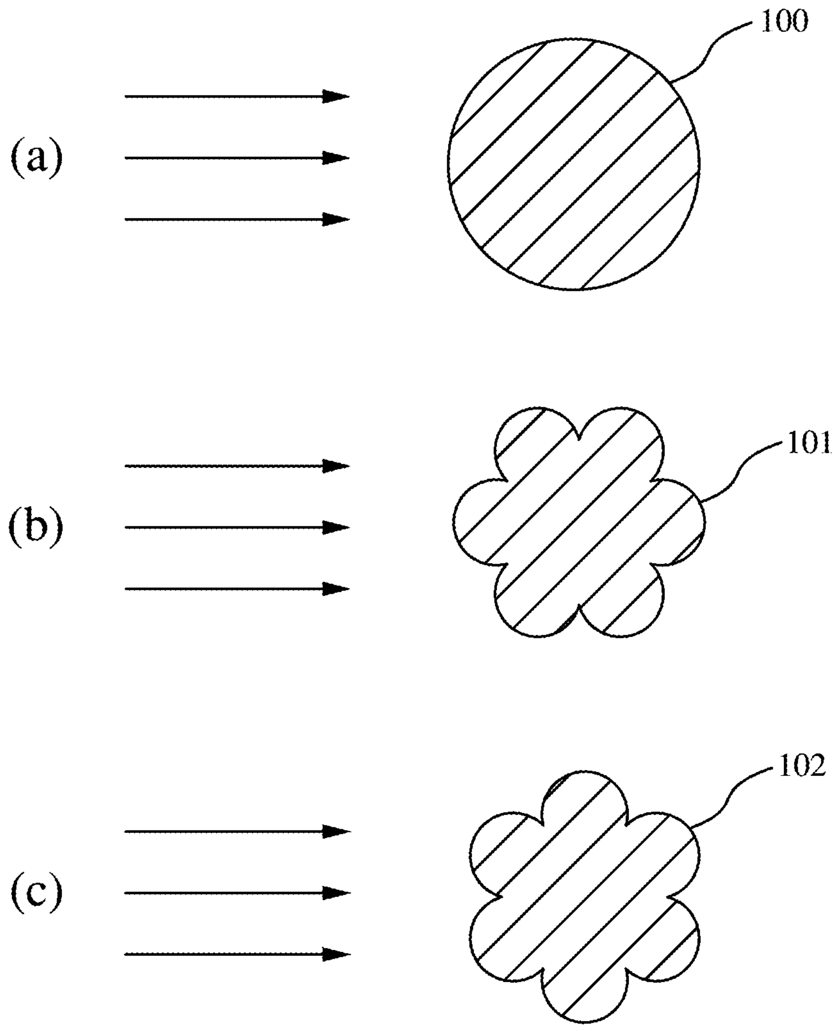
FIGS. 9 and 10 are top views showing other examples of the oscillating body of the bladeless wind energy harvester according to an embodiment of the present invention.
Figure 10:
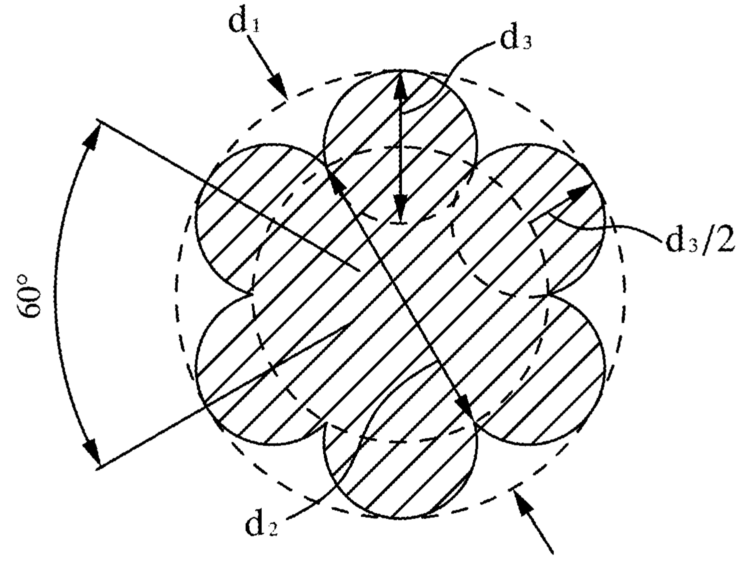

For example, referring to FIG. 9, (c) and FIG. 10, an oscillating body 102 has the cross-sectional shape of '  ', so that the Reynolds number of the wind colliding against the oscillating body 102 increases, thereby improving power generation efficiency.

Figure 11:
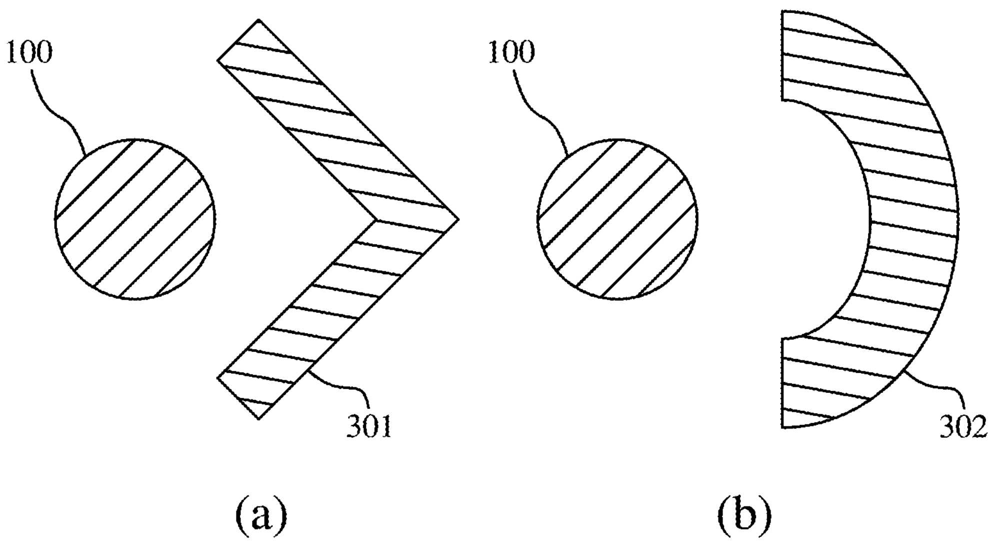
FIG. 11 illustrates top views (a) and (b), showing other examples of the aerodynamic barrier of the bladeless wind energy harvester according to an embodiment of the present invention.

Further, referring to FIG. 11, (a), an aerodynamic barrier 301 located on the downstream flow of the oscillating body 100 is bent at the central portion thereof, so that the wind colliding against the aerodynamic barrier 301 is prevented from flowing outward and thus induced to flow toward the oscillating body 100.

Furthermore, referring to FIG. 11, (b), an aerodynamic barrier 302 located on the downstream flow of the oscillating body 100 is entirely rounded around the central portion thereof, so that the wind colliding against the aerodynamic barrier 302 is prevented from flowing outward and thus induced to flow toward the oscillating body 100.

As described above, the bladeless wind energy harvester according to the present invention is capable to use the vibrations produced by vortex induced vibration of the oscillating body and consequently rotation of generator to convert wind energy into electric energy, thereby advantageously improving the energy generation efficiency.

Although embodiments of the invention have been described in considerable detail, numerous variations and modifications will become apparent to those skilled in the art once the above disclosure is fully appreciated.

While the present invention has been described with reference to the particular illustrative embodiments, it is not to be restricted by disclosed embodiments of the invention but only by the appended claims. It is to be appreciated that those skilled in the art can change or modify embodiments of the invention without departing from the scope and spirit of the present invention. It is therefore intended that the scope of the invention be limited not by this detailed description, but rather by the claims appended hereto.

According to the present invention, such new geometric shapes for the oscillating body are suggested, and the aerodynamic barrier behind the oscillating body is also utilized, so that a distance between the aerodynamic barrier and the oscillating body is optimized to improve the energy generation efficiency of the FIV-based energy harvesting device. According to the present invention, the oscillating body has the optimized geometric structure, and if the flat aerodynamic barrier behind the oscillating body is utilized, further, vibration amplitudes increase to raise the harvested energy. That is, as the Reynolds number increases, an amount of power generated increases. The optimal distance of Z/D is 0.36, and as the aerodynamic barrier is used at the optimal distance, the highest amount of power generated through the geometric structure suggested when the Reynolds number=16000 is larger by 26% than the cylindrical oscillating body having the aerodynamic barrier. The cylindrical oscillating body utilizing the aerodynamic barrier has an amount of power generated larger by about 85% than that utilizing no aerodynamic barrier. If the width of the aerodynamic barrier is equal to the diameter of the cylindrical oscillating body, the bladeless wind energy harvester has better performance. The geometric structure of the bladeless wind energy harvester with the suggested aerodynamic barrier allows the largest number of vortices to be generated. In the case of a convex model with the aerodynamic barrier, the highest value of turbulent flow energy is greater by 41% than a simple model, which is obtained by unstable aerodynamic force applied to the model. According to an instant flow pattern and a speed vector image, vortex shedding of the convex model with the aerodynamic barrier increases the vortex shedding of the aerodynamic barrier behind the model, and the vortices shed are added to produce stronger vortices. To produce manual control for wake parameters and suggest a new generation bladeless wind energy harvester, lastly, there is suggested a new configuration wherein the aerodynamic barrier is located on the downstream of the oscillating body providing important influences on induced voltages. The geometric shape of the oscillating body, which is inspired by nature, has an optimal width, and further, the aerodynamic barrier is located at an optimal distance from the oscillating body, so that the bladeless wind energy harvester according to the present invention can have an amount of harvested energy of about 86% larger than the existing bladeless wind turbine.

The invention claimed is:

1. A bladeless wind energy harvester comprising:

an oscillating body having a partial gear connected at a first end of the oscillating body, the oscillating body extending along a longitudinal axis to a second end;

an aerodynamic barrier disposed downstream of the oscillating body with respect to a flow direction of a fluid flow, the aerodynamic barrier being spaced apart from the oscillating body, and the aerodynamic barrier having, in a first direction perpendicular to the flow direction of the fluid flow, a width equal to or greater than a width of the oscillating body;

a gear box including a plurality of receiving shafts, each receiving shaft being engaged with the partial gear of the oscillating body via a transmission gear, a plurality of clutched gears attached to the plurality of receiving shafts, each clutched gear having a unidirectional clutch configured for unidirectional rotation, and an output shaft connected to an output gear that is engaged with each of the plurality of clutched gears, wherein the gear box rotatably supports the oscillating body and converts oscillation of the oscillating body into a unidirectional rotation of the output shaft by receiving reciprocal rotations of the plurality of receiving shafts caused by the oscillation of the oscillating body and converting the reciprocal rotations into the unidirectional rotation of the output shaft using the plurality of clutched gears engaged with the output gear connected to the output shaft; and a generator connected to the gear box via the output shaft such that the unidirectional rotation of the output shaft causes the generator to generate electric energy, wherein the oscillating body and the aerodynamic barrier are arranged such that the longitudinal axis of the oscillating body is parallel to a longitudinal axis of the aerodynamic barrier in a second direction perpendicular to the flow direction of the fluid flow and perpendicular to the first direction, and the oscillating body is configured to oscillate due to vortices generated by the fluid flow interacting in a space between the oscillating body and the aerodynamic barrier, and wherein the aerodynamic barrier comprises a cross-section throughout a central portion of the aerodynamic barrier, the cross-section being bent at or rounded around the longitudinal axis of the aerodynamic barrier on a side of the aerodynamic barrier facing the oscillating body, such that the fluid flow colliding against the aerodynamic barrier after flowing around the oscillating body is prevented from flowing outward and thus is induced to flow toward the oscillating body to generate the vortices.

2. The bladeless wind energy harvester according to claim 1, wherein the aerodynamic barrier is connected to at least one linear bearing to adjust a distance of the space between the oscillating body and the aerodynamic barrier.

3. The bladeless wind energy harvester according to claim 1, further comprising:

a base having a rotatable foundation plate configured to support the gear box, the oscillating body, and the aerodynamic barrier such that the gear box, the oscillating body, and the aerodynamic barrier are rotatable with the rotatable foundation plate about a vertical axis, wherein the vertical axis is aligned with a direction of gravity.

4. The bladeless wind energy harvester according to claim 3, further comprising:

a flow guide attached to the rotatable foundation plate supporting the oscillating body and the aerodynamic barrier, wherein the flow guide is configured to cause the rotatable foundation plate to rotate about the vertical axis so as to orient the aerodynamic barrier toward the flow direction of the fluid flow.

* * * * *